(12) United States Patent
Arthurs et al.

(10) Patent No.: US 7,971,210 B2
(45) Date of Patent: *Jun. 28, 2011

(54) INTERFACE FOR PROCESSING CLIENT-SERVER METHOD CALLS WITHIN A SINGLE VIRTUAL MACHINE

(75) Inventors: Brendan Arthurs, Malahide (IE); Stanley K. Jerrard-Dunne, Leopardstown (IE); Kieran J. O'Mahony, Faha (IE); Charles R. E. Smith, Celbridge (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/573,497

(22) Filed: Oct. 5, 2009

(65) Prior Publication Data
US 2010/0023943 A1 Jan. 28, 2010

Related U.S. Application Data

(63) Continuation of application No. 11/074,550, filed on Mar. 8, 2005, now Pat. No. 7,607,128.

(30) Foreign Application Priority Data

Jul. 21, 2004 (GB) .................................. 0416259.0

(51) Int. Cl.
*G06F 13/00* (2006.01)
(52) U.S. Cl. .............................. 719/330; 719/328; 718/1
(58) Field of Classification Search ...... 718/1; 719/328, 719/330
See application file for complete search history.

(56) References Cited

U.S. PATENT DOCUMENTS

| 5,928,323 | A | 7/1999 | Gosling et al. | |
|---|---|---|---|---|
| 6,327,628 | B1 | 12/2001 | Anuff et al. | |
| 6,401,109 | B1 | 6/2002 | Heiney et al. | |
| 6,813,641 | B2 | 11/2004 | Fomenko et al. | |
| 6,854,114 | B1 | 2/2005 | Sexton et al. | |
| 6,886,157 | B2* | 4/2005 | Long et al. | 717/151 |
| 6,978,447 | B1* | 12/2005 | Okmianski | 717/139 |
| 6,996,829 | B2 | 2/2006 | Meyer | |
| 7,203,769 | B2 | 4/2007 | Schnier | |
| 2002/0039352 | A1* | 4/2002 | El-Fekih et al. | 370/252 |
| 2004/0111730 | A1* | 6/2004 | Apte | 719/330 |
| 2004/0216042 | A1 | 10/2004 | Consolatti et al. | |
| 2005/0005158 | A1 | 1/2005 | Alaluf | |
| 2005/0044197 | A1 | 2/2005 | Lai | |
| 2005/0044233 | A1 | 2/2005 | Cai et al. | |
| 2005/0050551 | A1 | 3/2005 | Sparago et al. | |

OTHER PUBLICATIONS

U.S. Appl. No. 11/074,550, "Office Action", dated Jan. 7, 2009, 12 pages.

(Continued)

*Primary Examiner* — Andy Ho
(74) *Attorney, Agent, or Firm* — Daniel McLoughlin; Hoffman Warnick LLC

(57) ABSTRACT

The present invention concerns a method and system for enabling a server application to be executed in the same Java Virtual Machine (VM) as a client application using direct Java method calls without the need for remote communications protocol processing of the method calls. This is achieved by providing an application program interface (API) that exposes objects comprising the server application program to the client application program, whereby a client application method call is reduced by the interface to a Plain Old Java Objects (POJO) method call.

25 Claims, 4 Drawing Sheets

OTHER PUBLICATIONS

U.S. Appl. No. 11/074,550, "Amendment", dated Apr. 7, 2009, 17 pages.
U.S. Appl. No. 11/074,550, "Notice of Allowance", dated Jun. 10, 2009, 4 pages.
Scott, U.S. Appl. No. 11/074,550, Office Action Communication, GB920040028US1, Jan. 7, 2009, 12 pages.
Ho, U.S. Appl. No. 11/074,550, Notice of Allowance & Fees Due, GB920040028US1, Jun. 10, 2009, 4 pages.

* cited by examiner

INTERFACE FOR PROCESSING CLIENT-SERVER METHOD CALLS WITHIN A SINGLE VIRTUAL MACHINE

REFERENCE TO PRIOR APPLICATION

The current application is a continuation of U.S. Utility patent application Ser. No. 11/074,550, filed Mar. 8, 2005 which has issued as U.S. Pat. No. 7,607,128, and which claims the benefit of co-pending U.K. Patent Application No. 0416259.0, filed on Jul. 21, 2004, both of which are hereby incorporated herein by reference.

BACKGROUND OF THE INVENTION

1. Technical Field

The present invention concerns a method and system for enabling a server application to be executed in the same Virtual Machine (VM) as a client application using direct object oriented programming method calls, without the need for remote communications protocol processing of the method calls. The present invention is particularly directed to a computing device hosting a single Java VM (JVM) for enabling a client application to make method calls to a server application also executing on the JVM through a direct Java interface of the client program.

2. Background Art

Object oriented programming based on an object model is a new way of programming computer programs that has become very popular over the past several years. Object oriented programming uses objects as its fundamental program building blocks rather than procedures as in conventional procedural programming. The focus of object-oriented program design is to define a set of autonomous entities that can work together. These autonomous entities are, of course, the objects.

Conceptually, an object has two parts, an external object interface and internal object data. Internal data is encapsulated by the object interface such that other objects must communicate with that object through its interface. Thus, the only way to retrieve, process or otherwise operate on the encapsulated data is through methods defined for the object. This protects the internal portion of the object from outside tampering. Additionally, because outside objects have no access to the internal implementation, that internal implementation can change without affecting other aspects of the program. The object system thus isolates the requestor of services (clients) from the providers of services (servers) by a well defined encapsulating interface.

Data in an object is operated upon by calling "methods" of the object. In the object model, a client object sends a call to the server object system. The call identifies a particular object and specifies what method is to be performed by the object, and provides any parameters required. The object interprets the message to decide what service to perform, and returns back any data that results.

Because all operations on an object are expressed as calls from one object to another, methods can be called by remote objects. Objects that reside in different locations that communicate with each other across a network are called distributed objects in a distributed object system.

Another central concept in object-oriented programming is the class. A class is a template that defines a type of object. A class is defined by a set of class parameters that specify the details of objects that belong to its class. By defining a class, objects can be created that belong to the class without having to rewrite the entire definition. This promotes the reusability of existing definitions and promotes efficient use of program code.

There are many computer languages that support object-oriented programming. For example, Smalltalk, Object Pascal, C++ and Java are all programming languages that to one degree or another support object-oriented programming. Any of these and others can be used to write programs that use objects.

Several standards exist to provide for the sharing of objects across various types of networks, operating systems and hardware platforms. These standards lower the cost of developing distributed object computing systems. One such standard is the Common Object Request Broker Architecture (CORBA) specification as established by the Object Management Group (OMG). CORBA is an OMG specification designed to provide for the sharing of objects across a wide variety of hardware platforms and operating systems. Applications that conform to the CORBA specification can communicate with one another regardless of location or vendor. In particular, CORBA defines interoperability by specifying the design of Object Request Brokers (ORBs) such that ORBs from different vendors can interoperate. This is done by defining ORB interfaces in a language-independent specification.

An ORB is a program that establishes client-server relationships between objects. ORBs provide the infrastructure that allows objects to converse, independent of the specific platforms and techniques used to implement the objects. Using an ORB, a client can transparently invoke a method on a server object, which can be on the same machine or across a network. The ORB operates by intercepting method calls and finding an object that can implement the request, passing the request parameters to the object, invoking the method, and returning the results. While doing so, the client does not have to be aware of where the object is located, its programming language, its operating system and any other system aspects. Thus, the ORB provides interoperability between applications on different machines in heterogeneous distributed object environments and seamlessly inter-connects multiple object systems.

CORBA uses the concept of a proxy object to facilitate communication between distributed objects. A proxy object is an object of a proxy class that has the same methods as a particular real object, except that each method on the proxy object does nothing other than forward the method request through an ORB and across the network to the real object. A proxy object thus has the same interface as the real object (i.e., the methods that can be performed on the object) but has a different implementation (i.e., instead of performing the method, the method request is passed to the real object).

Java is a modern object oriented programming language specially designed to create distributed object systems. Java is a trademark of Sun Microsystems Inc. Java offers many features and advantages that make it possibly the most desirable object oriented programming language to use. First, Java is specifically designed to create small programs, commonly called applets, that can reside on the network in centralized servers, and are delivered to the client machine only when needed. Second, Java is completely platform independent. A Java program can be written once and run on any type of platform that contains a Java Virtual Machine (JVM). Third, Java is an object oriented language, meaning that software written in Java can take advantage of the benefits of object oriented programming.

As in other object oriented systems, operations are performed by an object calling a method of another object. These objects can reside locally on the same machine or on separate JVM's on separate computers (Java objects on separate JVM's are called remote objects). This remote object interaction can be done using ORB's, as discussed above, or it can be done using the Java Remote Method Invocation (RMI) standard.

The Java RMI standard provides a system that has been specifically designed to facilitate distributed object interaction for Java Objects. The Java RMI, as it is designed for only Java objects, can provide seamless integration between Java Objects by taking advantage of the Java object model whenever possible. The Java RMI is designed to support seamless remote invocation of objects on different machines, and thus make the creation of reliable distributed applications as simple as possible.

As stated before, object-oriented programming uses objects that interact with each other through method calls. These method calls are implemented by threads. For example, for an object A to interact with an object B, a thread first gets object A. While running within A's method, the thread then gets object B and calls one of B's methods. Thus, all parts of the interaction are performed by the same thread. This interaction is referred to as "A calls B".

In distributed object systems, such as Java RMI, the interaction between threads and objects is more complex. In these distributed systems, a "client object" runs in a client thread on the client system and calls methods on a "server object", which runs in a server thread on a server system. In particular, making a call from an object A to an object B (where B is on a remote machine) involves a client thread "getting" object A, and then "invoking" A's method to call object B (where "getting" an object comprises obtaining a pointer to the object and "invoking" comprises allocating a stack frame to run the object's method). To call object B in a CORBA or Java RMI system, the client thread must first get a proxy object for object B. After getting the proxy, the client thread then invokes the same method on the proxy as if it was calling the method on the real object B. The code of the proxy's method, running in the client thread, delivers the call and all parameters to the real object B through the infrastructure (e.g., transport layer) of the distributed object system. The client thread then waits for the return (with or without a return value) of the remote call.

On the server side, the distributed system typically has a connection for remote call requests. When this server thread receives the call, it extracts all the data passed from the client side. From this data, the server thread gets the requested real object, and invokes the requested method on it. When the method is done, the server thread passes any return value back to the client side. These are done within the server thread. Thus, all the activity on the server side is done within the server thread.

Where the distributed object system is a Java based system, a method call from a client object to a remote server object is executed in its own dedicated JVM hosted by the application server with the method call on the client machine side being executed by its own dedicated JVM hosted by the client machine. Communication of such method calls from client machines to remote application servers are implemented by suitable remote communications protocols or mechanisms such as MBeans, SOAP requests or Web interfaces.

Message driven beans (MBeans or "Message Beans") are one of the family of component bean types defined by the Enterprise Java Bean (EJB) specification. The bean types include session beans, which contain business logic and maintain a state associated with client sessions, and entity beans, which map objects to persistent data. Message driven beans provide asynchrony to EJB based applications by acting as message consumers. A message bean receives messages sent by clients or other beans. Messages sent to the Message bean are placed in a queue and processed by the EJB server asynchronously.

The Simple Object Access Protocol (SOAP) is an XML-based lightweight protocol for the exchange of information in a decentralized, distributed environment. SOAP defines a messaging protocol between requester and provider objects, such that the requesting objects can perform a remote method invocation on the providing objects in an object-oriented programming fashion. The SOAP specification was co-authored by Microsoft, IBM, Lotus, UserLand, and DevelopMentor.

The Extensible Mark-up Language (XML) is a text-based mark-up language specification from the World Wide Web Consortium (W3C). Unlike HyperText Markup Language (HTML), which uses tags for describing presentation and data, XML is strictly for the definition of portable structured data. It can be used as a language for defining data descriptive languages, such as mark-up grammars or vocabularies and interchange formats and messaging protocols. XML messages may be written using WSDL.

The Web Services Description Language (WSDL) is an XML vocabulary that provides a standard way of describing service Interface Definition Languages (IDLs). WSDL is the resulting artefact of a convergence of activity between the Network Accessible Service Specification Language (NASSL) developed by IBM and the Specification and Description Language (SDL) developed by Microsoft. It provides a simple way for service providers to describe the format of requests and response messages for remote method invocations (RMIs). WSDL addresses this topic of service IDLs independently of the underlying protocol and encoding requirements. In general, WSDL provides an abstract language for defining the published operations of a service with their respective parameters and data types. The language also addresses the definition of the location and binding details of the service.

A problem encountered with communicating method calls (object requests) using such mechanism or protocols is that they invariably involve performance issues due to the distance between client and server and the overhead associated with serializing and de-serializing the requests at each end.

When the server application is embedded in a local client application, i.e., being executed by the same computing machine, the communications mechanisms and protocols described above are still employed to communicate a request from the client object to the server object (these now being hosted by one and the same machine but executed by separate JVMs hosted by the machine) as though the system were still a distributed object system. Consequently, the described communications mechanisms and protocols constitute an unnecessary overhead and the interfaces between the client and server are redundant.

It is an object of the invention to mitigate and/or obviate problems associated with the interoperation of client and server applications on the same machine.

It is a further object of the invention to provide an interface enabling a server application to be executed in the same VM as a client application using standard object oriented programming method calls without the need for remote communications protocol processing of the method calls.

SUMMARY OF THE INVENTION

According to a first aspect of the present invention, there is provided a method of processing a client application method call to a server application in an object oriented programming environment, the method comprising the steps of: providing a virtual machine (VM) on a computing system, the VM being arranged to execute both the client and server application programs; and providing an application program interface (API) that exposes objects comprising the server application program to the client application program, whereby the client application method call is reduced by the interface to a plain object oriented programming method call.

According to a second aspect of the present invention, there is provided a method of providing an interface between a client application program and a server application program both being executed on the same virtual machine (VM) hosted by a computing system, the method comprising the step of generating program code that exposes objects comprising the server application program to the client application program, whereby a client application method call is reduced by the interface to a plain object oriented programming method call.

According to a third aspect of the present invention, there is provided a system for generating an interface between a client application program and a server application program that are both being executed on the same virtual machine (VM) hosted by a computing system, the system comprising a code generator that generates interface program code that exposes objects comprising the server application program to the client application program, whereby a client application method call is reduced by the interface to a plain object oriented programming method call.

According to a fourth aspect of the present invention, there is provided a computing device comprising: a processor for executing program code; and a machine readable medium for storing program code to be executed by the processor, the machine readable medium storing: program code comprising an object oriented programming virtual machine (VM); program code comprising a client application program; program code comprising a server application program; and program code comprising an interface that exposes objects comprising the server application program to the client application program, whereby a client application method call is reduced by the interface to a plain object oriented programming method call.

According to a fifth aspect of the present invention, there is provided program code embodied on a machine readable medium for processing a client application method call to a server application in an object oriented programming environment, wherein the program code comprises program code for: providing a virtual machine (VM) on a computing system, the VM being arranged to execute both the client and server application programs; and providing an application program interface (API) that exposes objects comprising the server application program to the client application program, whereby the client application method call is reduced by the interface to a plain object oriented programming method call.

According to a sixth aspect of the present invention, there is provided program code embodied on a machine readable medium for generating an interface between a client application program and a server application program that are both being executed on the same virtual machine (VM) hosted by a computing system, the program code comprising a code generator that generates interface program code that exposes objects comprising the server application program to the client application program, whereby a client application method call is reduced by the interface to a plain object oriented programming method call.

Other features of the present invention will be apparent from the appended claims.

BRIEF DESCRIPTION OF THE DRAWINGS

A description of the present invention will follow with reference to the accompanying drawings, of which.

DETAILED DESCRIPTION OF THE INVENTION

The foregoing and further features of the present invention will be more readily understood from a description of a preferred embodiment, by way of example thereof, with reference to the accompanying figures.

Figure 1:
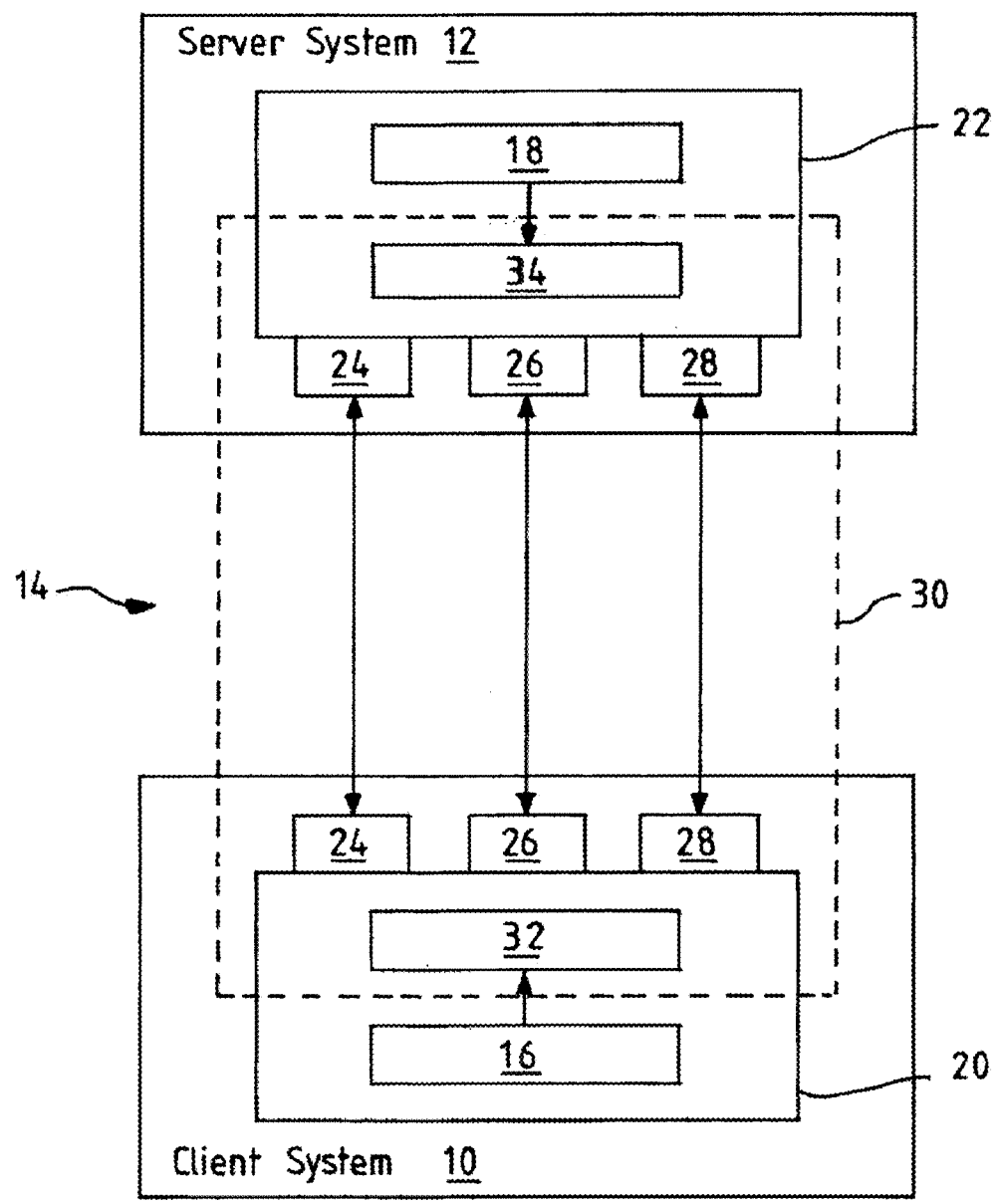
FIG. 1 is a schematic block diagram of a conventional arrangement of a client and server in a distributed object system.

Referring now to FIG. 1, a client system 10 and a server system 12 are shown in order to illustrate a known arrangement of a client and server in a distributed object system by way of comparison with the preferred embodiment of the present invention. The client system 10 is connected to the server system 12 over a network connection 14. The network connection 14 can be any suitable network mechanism, such as a local area network (LAN), a wide-area-network (WAN), an intranet connection, or an Internet connection allowing the client system 10 to communicate with the server system 12.

The client system 10 can be any suitable client system, such as an IBM compatible personal computer. The client system 10 includes a client object 16. The client object 16 is any software object such as a Java object. The server system 12 includes a server object 18.

The terms client object and server object refer to the fact that the client object calls a method on the server object, and the server object performs the method. An object can be a client object at one moment when it makes a method call to another object and a server object the next moment when it receives a method call. Thus, the client object 16 can be any object making a call and the server object 18 can be any object receiving the method call. Because the client object 16 and the server object 18 are on different systems 10, 12, they are referred to as remote from one another. Thus a call from the client object 16 to the server object 18 is a remote method call. Where the client object 16 and server object 18 are both Java objects, they are remote in the sense that the client object 16 resides on one Java Virtual Machine (JVM), the client JVM 20, and the server object resides on a different JVM, the server JVM 22.

Since the objects 16, 18 are remote from each other, a distributed object system is needed to facilitate interaction between the objects 16, 18. This distributed object system can comprise any system, such as CORBA, but in the example illustrated comprises the Java Remote Method Invocation (RMI) system. The Java RMI provides the environment for the remote Java objects 16, 18 to communicate. The communication mechanisms and/or protocols may comprise any of a SOAP interface 24, a HyperText Transfer Protocol (HTTP) interface 26 or an MBeans interface 28. A logical thread system (denoted by broken line 30 in the figure) is used to facilitate remote interaction. The thread system 30 comprises a distributed thread 32 on the client system 10 and a distributed thread 34 on the server system 12. When the client object 16 makes a method call to the remote server object 18, the logical thread ensures that the appropriate thread is used for each part of the distributed transaction.

With the server system 12 being located remotely from the client system 10, it is necessary to employ mechanisms and protocols as aforesaid to enable client object requests to be communicated to remote server objects. It is therefore not possible to avoid the performance issues arising from this. However, where a server application is embedded in a client machine, then the reason for employing remote communication mechanisms and protocols is removed and continued use of such mechanisms is inefficient.

Figure 2:
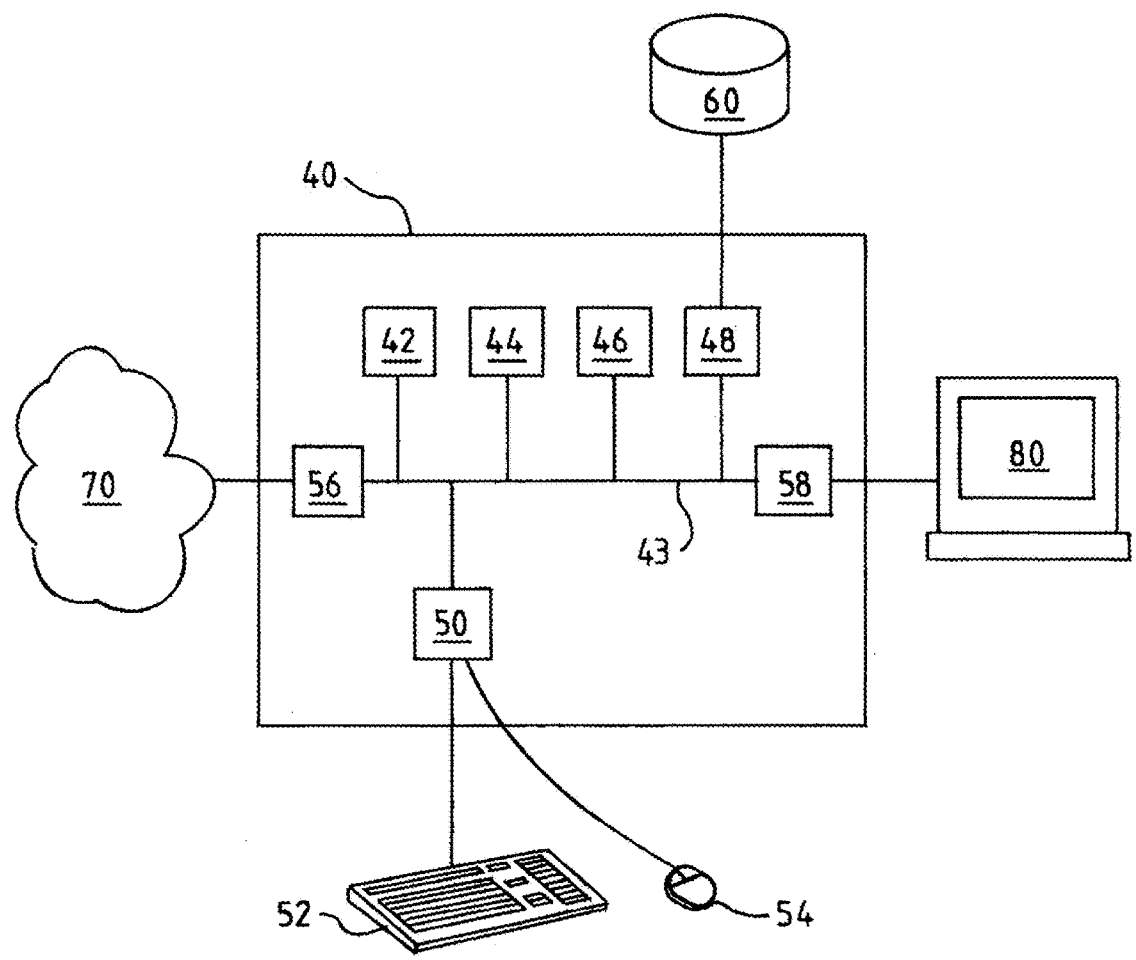
FIG. 2 is a block diagram of a representative hardware and operating environment in which the present invention may be put into effect.

Referring now to FIG. 2, this comprises a representative hardware and operating environment in which the present invention may be put into effect. It comprises a personal computer (PC) 40 such as an IBM compatible personal computer, Apple Macintosh computer or UNIX based workstation. The PC 40 has a central processing unit 42, such as a microprocessor, and a number of other units interconnected via a system bus 43. The PC 40 includes a Random Access Memory (RAM) 44, a Read Only Memory (ROM) 46, an I/O adapter 48 for connecting peripheral devices such as disk storage units 60 to the bus 43, a user interface adapter 50 for connecting a keyboard 52, a mouse 54, and/or other user interface devices such as a touch screen (not shown) to the bus 43, a communication adapter 56 for connecting the PC 40 to a communication network (e.g., a data processing network) 70 and a display adapter 58 for connecting the bus 43 to a monitor or display device 80. The PC 40 typically has resident thereon an operating system such as the Microsoft Windows NT or Windows XP Operating System (OS), the IBM OS/2 operating system, the MAC OS, or UNIX operating system. It will be appreciated that the present invention may also be implemented on other suitable computer platforms and operating systems including distributed computing environments.

Figure 3:
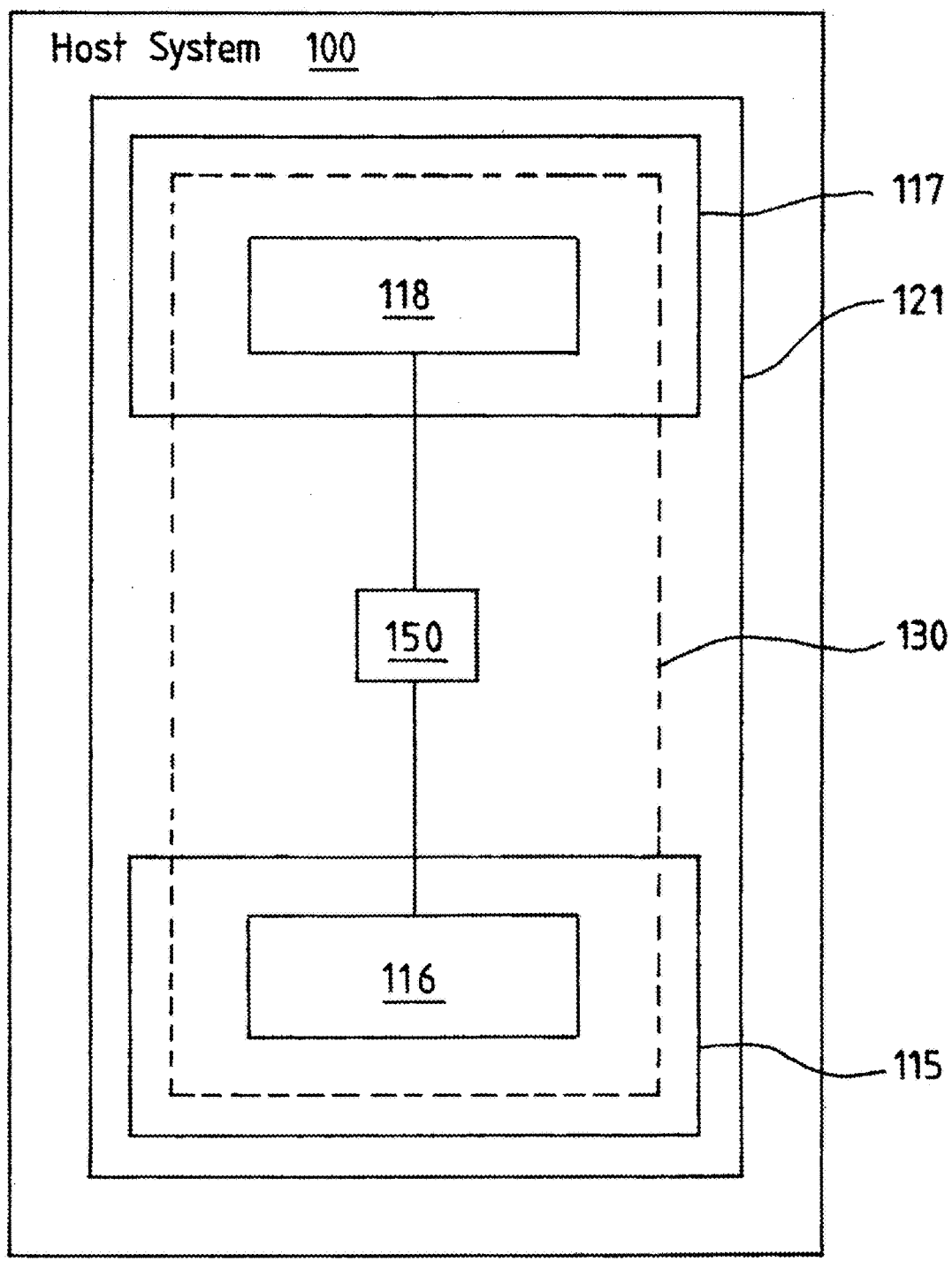
FIG. 3 is a schematic block diagram of a client-server arrangement in accordance with a preferred embodiment of the invention.

FIG. 3 is a schematic block diagram illustrating a preferred embodiment of a system in accordance with the present invention. In the following description of the preferred embodiment as depicted by FIG. 2, like numerals to those employed in the description of the known system depicted by FIG. 1, but preceded by the numeral "1", will be used to denote like parts.

In the preferred embodiment, there is provided a single host system 100 for hosting a client application 115 including a client object 116 and a server application 117 including a server object 118. The host system 100 can be any suitable computing system such as an IBM compatible personal computer. The client and server objects 116, 118 can be any suitable software objects such as Java objects.

The host system 100 hosts a single virtual machine (VM) such as a Java VM (JVM) 121 which is arranged to execute both the client and server application programs 115, 117 as will be described hereinafter. When the client object 116 makes a method call to the server object 118, a logical thread (denoted by broken line 130 in the figure) links the client and server objects 116, 118.

Conventionally, where the client and server applications are hosted on the same host machine, they are executed in separate JVMs hosted by the machine such that method calls from client objects to server objects are still treated as remote method calls. Consequently, despite the client and server applications being hosted on the same machine, mechanisms and protocols as described with respect to the system arrangement of FIG. 1 are still required to enable the client object requests to be communicated to the "remote" server objects.

In contrast, for the system arrangement in accordance with the invention as depicted by FIG. 3, the present invention provides a single JVM 121 for executing both the client and server applications 115, 117. This is enabled by an interface 150 that reduces all method calls by the client application 115 that would normally cross a boundary or network interface between the client application 115 to the "remote" server application 117 to plain java calls using Plain Old Java Objects (POJO). Thus the interface 150 between the client application 115 and the server application 117 is used by the client application 115 to make direct object requests within a single, common JVM rather than using the already existing remote interfaces that would connect separate JVMs in a conventional arrangement.

The interface 150 is preferably constructed using the singleton design pattern since only a single instance of the interface 150 need exist within the JVM 121. The singleton design pattern is preferably used to construct the interface 150 because the program execution environment is hosted on a single JVM 121 and the interface so constructed enables access to the server application 117 to be made in a thread-safe manner. It also makes it easier to manage and cache server application side objects, which may themselves be singletons.

The foregoing can be better understood from an examination of existing interfaces and how they operate by way of comparison.

SOAP and HTTP are protocols that essentially allow commands (remote method calls) to be sent to a remote server system over a network connection, and, based on those commands, cause the server system to execute some methods and send responses. EJBs are objects on the server system application exposed to the client system application through a home interface and a remote interface, the home interface being used to create or delete instances of the objects and the remote interface being used to execute methods on the objects.

At the server system end of the network connection, the server system application interprets the command whether it be a SOAP message, an HTTP request or a method call to an EJB and, based on the required command and its parameters, executes one or more local methods on the server system side. Any results from the execution of the methods on the server system side are normally communicated over the network connection back to the client system end of the connection.

SOAP messages and EJB calls generally map method calls directly against objects on the server system via proxy objects. HTTP requests, however, normally require additional interpretation before a method is executed by the server system application, because, for example, the parameters passed in the HTTP request universal resource locator (URL) require interpretation.

In the present invention, the POJO interface 150 exposes the set of server objects 118 and methods necessary to fulfil the requirements of a specific client application 115. The POJO interface 150 provides a client application 115 with a simple Java interface 150 that it can use to perform server application operations on the same JVM 121 using Java method calls without remote communications protocol processing.

In a conventional distributed object system where the network connection interface between the client system and host system comprises an HTTP interface, client application method calls are processed on the server side as servlets. The normal manner of interacting with a server side servlet is by passing an HTTP request that addresses the servlet and receiving an HTTP response as a return message. The HTTP request may include a number of parameters for use in a server side method invocation.

The following example of a conventional HTTP request is given by way of illustration and comparison. For example, the server may provide a mechanism to query details about server performance and usage. This information can be retrieved with an HTTP request containing a URL such as:

HTTP://myserver/config/query?query=stats&hours=24

This request is a call to the query servlet with two parameters, namely:

1. The required query type, in this example "stats"; and
2. The number of hours for which statistics are to be returned.

In this example stats are being requested for the last 24 hours of server time. Therefore, the response will contain an XML stream containing the query data. The response will take the form:

```
<queryresults>
    <numberoflogins>123</numberoflogins>
    <failedlogins>12</failedlogins>
    <avgsessionlife>35</avgsessionlife>
    <avgresponsetime>789</avgresponsetime>
    <errorcount>6</errorcount>
</queryresults>
```

In contrast, in the preferred embodiment of the invention, a call to the POJO interface 150 to make this same query will be implemented as an application programming interface (API) taking the form:

String querystats(int hours);

The client application 115 calls this API to get the same XML results. The implementation of the querystats method call comprises:

```
String querystats(int hours)
{
    ServletDirectHttpRequest request = new ServletDirectHttpRequest( );
    request.setParameter("query", "stats");
    request.setParameter("hours", Integer.toString(hours));
    ServletDirectHttpResponse response =
    new ServletDirectHttpResponse( );
    ServletDirectServletConfig config = new ServletDirectServletConfig( );
    QueryServletImpl servlet = new QueryServletImpl( );
    // Create an instance of the servlet class
    servlet.init(config);
    servlet.service(request, response);
    servlet.destroy( );
    return response.getData( );
}
```

Thus, the ServletDirect objects are the present invention's replacement implementations of the HTTP request, HTTP response and ServletConfig objects normally passed to the server side servlet via the HTTP protocol. These replacement implementations enable the server side servlet to be spoofed into believing it is running normally thereby providing a direct mechanism to call the servlet class methods init, service and destroy directly through the POJO interface 150 without network level requests.

In the case of SOAP and EJB, the POJO interface 150 of the present invention provides a set of client wrapper methods that call the server system methods or server object methods directly, thus eliminating the network overhead of such requests between remote client and server systems. The wrapper methods expose the server objects and methods through a Java API, which the client application accesses through direct, standard Java method calls.

It will be appreciated that such wrapper methods can be entirely manually created by a skilled programmer, but it will also be appreciated that employing a once off automatic code generation process can help eliminate tedium and reduce errors in the development of the code for such methods. A process and means of generating the code for such wrapper methods is illustrated in FIG. 4.

Figure 4:
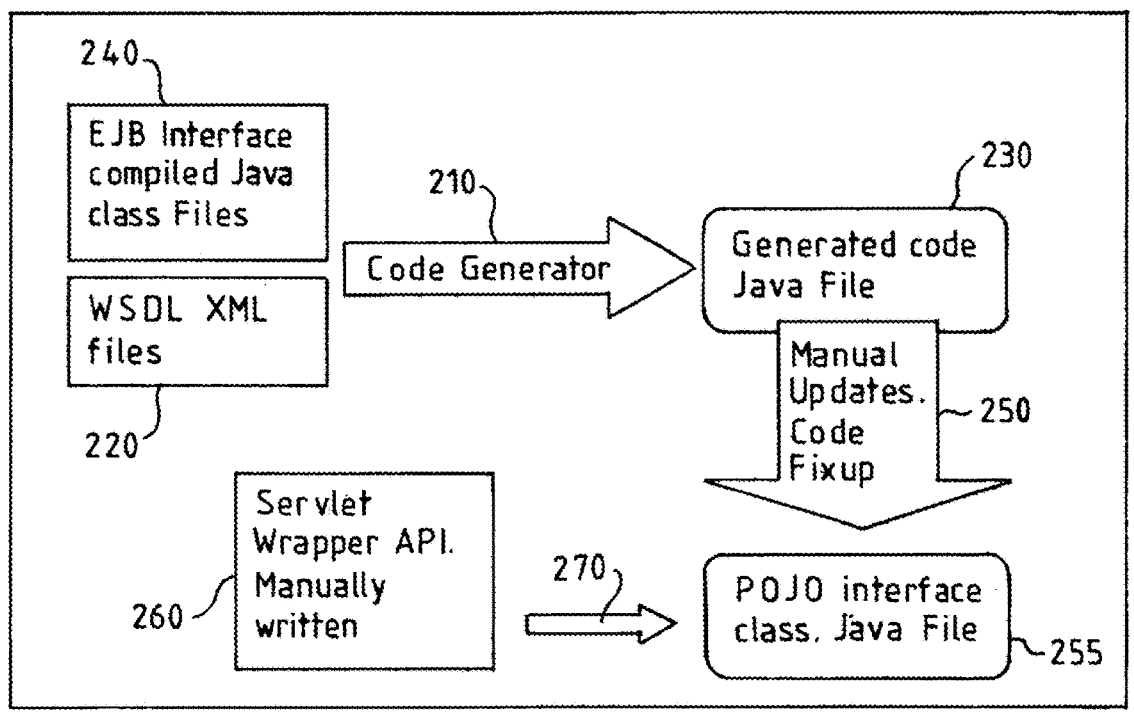
FIG. 4 is a flow diagram of an interface code generation process for the preferred embodiment depicted by FIG. 3.

As illustrated by FIG. 4, the code generation process preferably comprises a combination of automatic code generation and manual programming. In a first step 210, code is generated to replace the SOAP interfaces 220 by interpreting the associated WSDL "Web Services Description Language" files and, based on the declarations in that file, generating methods for the POJO. This step 210 comprises an XML parser of the code generating device (represented by arrow 210 in FIG. 4) reading the WSDL XML files for the SOAP interfaces 220 and, for each operation declared in the WSDL files, generating a method call within generated Java code 230. This is illustrated by the following example.

Example for SOAP Interfaces:

WSDL contains:

```
<message name="getTermRequest">
    <part name="term" type="xs:string"/>
</message>
<message name="getTermResponse">
    <part name="value" type="xs:string"/>
</message>
<portType name="glossaryTerms">
    <operation name="getTerm">
        <input message="getTermRequest"/>
        <output message="getTermResponse"/>
    </operation>
</portType>
```

In the present invention, a method like this is generated in the POJO:

```
String getTerm(String getTermRequest)
{
    glossaryTermsImpl=server.getObject("glossaryTerms");
    return glossaryTerms.getTerm(getTermRequest);
}
```

Similarly, for the EJB interfaces, the existing EJB remote interfaces 240 are used as the basis for generating POJO code. The code generator 210 reads the EJB interface Java files 240 and, using a simple string parser, determines the declared methods and generates a method call within the generated code Java file 230. This is illustrated by the following example:

Example for EJB Interfaces:

EJB interfaces:

```
public interface ServerData extends javax.ejb.EJBObject
{
    String getServerName( ) throws java.rmi.RemoteException;
    Date getServerStartupTime( ) throws
        java.rmi.RemoteException;
}
```

In the POJO, methods are generated as follows:

```
String getServerName( )
{
    ServerDataImpl=server.getObject("ServerData");
    Return ServerDataImpl.getServerName( );
}
Date getServerStartupTime( )
{
    ServerDataImpl=server.getObject("ServerData");
    Return ServerDataImpl. getServerStartupTime( );
}
```

The automatically generated code Java files 230 are used as the starting point whereby a skilled programmer, with a working knowledge of the server application mechanics, can manually apply updates 250 to tweak the generated code 230 for the purposes of efficiency, etc., to produce Java source files 255. Additionally, further methods, for example the servlet wrappers 260, may be added 270 to the updated Java source files 255. The Java source files 255 are then compiled to produce the POJO interface object 150 as illustrated in FIG. 3.

The server object is therefore managed by the POJO interface 150 and is used to manage the object instances belonging to the server. It contains a list of server objects with information as follows for each server object:

```
String objectKey;
bool isSingleton;
Object cachedObject;
String implementationclass;
```

The "objectKey" is the key that is used to search for an instance of the object. For example, the code
ServerDataImpl=server.getObject("ServerData");
will lookup the object with the key "ServerData". "isSingleton" indicates if only a single object instance for this is to be dealt with, and, if so, only a single object is ever created and cached in the "cachedObject". The implementation class is a string naming the class to use from the server. By convention, implementation classes use the interface name with "Impl" appended, for example, "ServerDataImpl" is the implementation class for "ServerData". This convention is used to assist in the generation of the interface code. The determination of the correct values for the "isSingleton" variable is a manual process, the code generator 210 will always set this false.

The code generating process and means depicted by FIG. 4 can be implemented through an integrated development environment (IDE) program including an editor tool and a code parser which will be familiar to a skilled artisan.

In summary, the present invention concerns a method and system for enabling a server application to be executed in the same Java Virtual Machine (VM) as a client application using direct Java method calls without the need for remote communications protocol processing of the method calls. This is achieved by providing an application program interface (API) that exposes objects comprising the server application program to the client application program, whereby a client application method call is reduced by the interface to a Plain Old Java Objects (POJO) method call.

What is claimed is:

1. A method of processing a client application method call to a server application in an object oriented programming environment, the method comprising:

receiving a method call generated by the client application at an application programming interface (API) in a virtual machine on a computing system, wherein the method call requests performance of a method by a server object included in the server application; and processing the method call completely within the virtual machine using the interface.

2. The method of claim 1, further comprising executing the client application in the virtual machine, wherein the method call is a plain object oriented programming method call.

3. The method of claim 1, further comprising executing the server application in the virtual machine.

4. The method of claim 1, wherein the processing includes calling the method of an instance of the server object included in the server application from the interface based on the method call.

5. The method of claim 4, wherein the processing further includes creating the instance of the server object within the virtual machine using the interface.

6. The method of claim 4, wherein the processing further includes creating an instance of each server object in a set of server objects configured to enable processing remote method calls for the server object within the virtual machine using the interface.

7. The method of claim 6, wherein the remote method calls are in the HyperText Transfer Protocol (HTTP) protocol.

8. The method of claim 1, wherein the method call is to a wrapper method in the interface configured to expose the method of the server object.

9. A computing system comprising:

an object oriented programming virtual machine embodied in a set of computing devices of the computing system, the virtual machine including an application programming interface (API) configured to receive a method call generated by a client application executing in the virtual machine and process the method call completely within the virtual machine, wherein the method call requests performance of a method by a server object included in a server application executing in the virtual machine.

10. The computing system of claim 9, wherein the method call is a plain object oriented programming method call.

11. The computing system of claim 9, the virtual machine further including:

the client application; and
the server application.

12. The computing system of claim 11, wherein the client and server applications are Java object oriented programming language programs and wherein the virtual machine is a Java Virtual Machine.

13. The computing system of claim 12, wherein the interface is a Plain Old Java Objects (POJO) application program interface.

14. The computing system of claim 9, wherein the interface calls the method of an instance of the server object included in the server application based on the method call.

15. The computing system of claim 14, wherein the interface creates the instance of the server object within the virtual machine in response to receiving the method call.

16. Program code embodied on a machine readable storage medium for processing a client application method call to a server application in an object oriented programming virtual machine, the program code including program code for:

receiving a method call generated by the client application, wherein the method call requests performance of a method by a server object included in the server application; and processing the method call completely within the virtual machine.

17. The program code of claim 16, wherein the processing includes calling the method of an instance of the server object included in the server application based on the method call.

18. The program code of claim 17, wherein the processing further includes creating the instance of the server object within the virtual machine.

19. The program code of claim 17, wherein the processing further includes creating an instance of each server object in a set of server objects configured to enable processing remote method calls for the server object within the virtual machine.

20. A computing system comprising:
an object oriented programming virtual machine embodied in a set of computing devices of the computing system, the virtual machine including a client application configured to generate a method call for processing by an interface within the virtual machine, wherein the method call requests performance of a method by a server object included in a server application executing in the virtual machine, and wherein the method call is a plain object oriented programming method call.

21. The computing system of claim 20, further comprising the interface, wherein the interface processes the method call completely within the virtual machine.

22. The computing system of claim 21, wherein the virtual machine is a Java virtual machine and the client application is a Java object oriented programming language program.

23. The computing system of claim 22, wherein the interface is a Plain Old Java Objects (POJO) application program interface.

24. The computing system of claim 21, wherein the interface calls the method of an instance of the server object included in the server application based on the method call.

25. The computing system of claim 21, wherein the interface creates the instance of the server object within the virtual machine in response to receiving the method call.

* * * * *